(12) United States Patent
Saddoughi et al.

(10) Patent No.: US 7,686,257 B2
(45) Date of Patent: Mar. 30, 2010

(54) DUAL BIMORPH SYNTHETIC PULSATOR

(75) Inventors: Seyed Saddoughi, Clifton Park, NY (US); Matthew Boespflug, Clifton Park, NY (US); Scott Donnelly, Loudonville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1036 days.

(21) Appl. No.: 11/135,251

(22) Filed: May 23, 2005

(65) Prior Publication Data
US 2006/0273197 A1  Dec. 7, 2006

(51) Int. Cl.
*B64C 21/08* (2006.01)
(52) U.S. Cl. .................. 244/204; 244/208; 244/198; 244/201; 244/203
(58) Field of Classification Search .......... 244/198, 244/204, 207, 208, 200.1, 201, 1 N, 130, 244/53 B; 415/119, 914
See application file for complete search history.

(56) References Cited

U.S. PATENT DOCUMENTS

| | | | | |
|---|---|---|---|---|
| 5,934,611 A | * | 8/1999 | Tindell et al. ............. 244/53 B |
| 5,988,522 A | * | 11/1999 | Glezer et al. .................. 239/11 |
| 6,371,414 B1 | * | 4/2002 | Truax et al. ................. 244/201 |
| 6,722,581 B2 | | 4/2004 | Saddoughi |
| 2006/0022092 A1 | * | 2/2006 | Miller et al. ............. 244/200.1 |
| 2006/0219847 A1 | * | 10/2006 | Miller et al. ............. 244/204.1 |
| 2006/0273197 A1 | | 12/2006 | Saddoughi et al. |

* cited by examiner

*Primary Examiner*—Michael R Mansen
*Assistant Examiner*—Joshua J Michener
(74) *Attorney, Agent, or Firm*—Bracewell & Giuliani LLP

(57) ABSTRACT

The present invention provides a system and method for actively manipulating fluid flow over a surface using synthetic pulsators. Synthetic pulsators produce pulsed jet operable to manipulate the primary fluid flow proximate to the synthetic pulsator. The synthetic pulsator includes a synthetic jet actuator(s) operable to produce an oscillatory flow, and fluidic jet(s) operable to provide a continuous fluid flow. The oscillatory flow of the synthetic jet(s) and the continuous fluid flow of the fluidic jet(s) combine or mix to produce the pulsed jet operable to manipulate the primary fluid flow. These synthetic pulsators may then be actively manipulated to control the flow behavior of the ducted fluid flow, influence the inception point and trajectory of flow field vortices within the fluid flow, and reduce flow separation within the primary fluid flow.

11 Claims, 18 Drawing Sheets synthetic jet effector micro-bubble effector

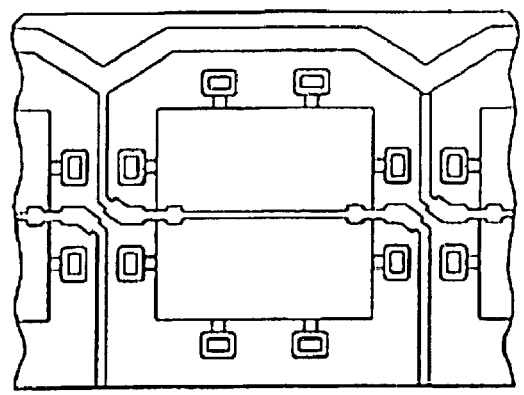
FIG. 9A mems sheer sensor
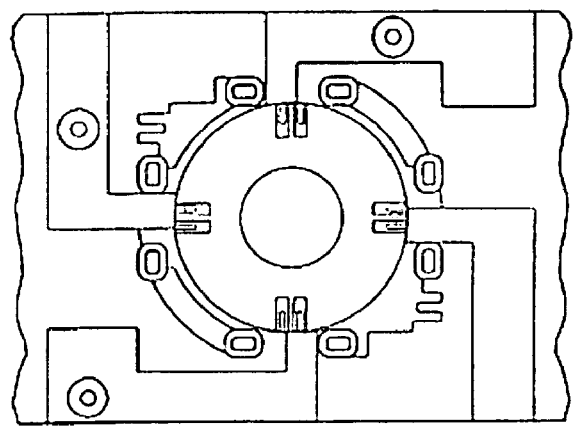
FIG. 9B mems pressure sensor
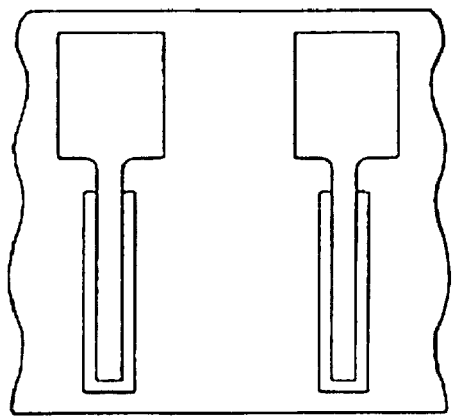
FIG. 9C mems velocity sensor

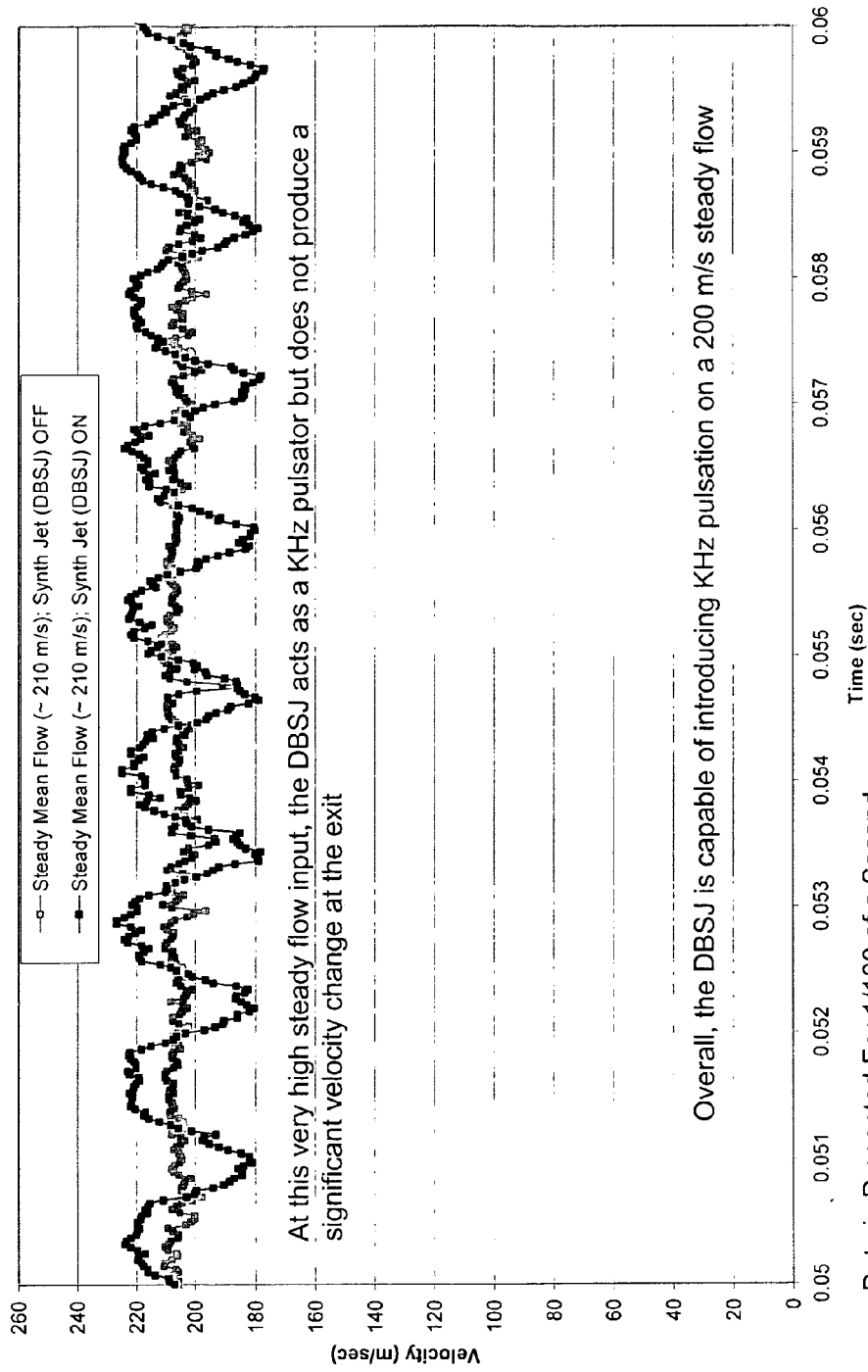

US 7,686,257 B2

DUAL BIMORPH SYNTHETIC PULSATOR

TECHNICAL FIELD OF THE INVENTION

The present invention relates generally to manipulation of fluid flows and more particularly, a system and method for manipulating fluid flows with active synthetic jets operable to pulse steady control fluid flows.

BACKGROUND OF THE INVENTION

Adverse (pressure gradient) fluid flows generated over aerodynamic surfaces can buffet and fatigue any downstream structures so exposed. Additionally, such flows can affect efficiency by increasing drag or resistance over the surface. Such adverse fluid flows can be generated at the fore body of an aircraft or other upstream structure, and damage control surfaces, engines, after body/empennage, nacelles, turrets, or other structures integrated into the airframe. Additionally, these adverse fluid flows can be ingested within engine air intakes or other like air inlets leading to poor performance and/or stalling of the aircraft engines. Stalling the aircraft engine creates a potentially hazardous condition.

Next generation aircraft, such as blended wing body, compound this problem by incorporating gas turbine inlets with serpentine spines within the air frame. Additionally, exotic aperture shapes for the inlet and outlet may cause excessive propulsion performance losses. These losses emanate from strong secondary flow gradients in the near wall boundary of the airflow, which produce coherent large-scale adverse fluid flows.

In the past, adverse flow fields were avoided by redesigning the aircraft or aerodynamic surfaces in order to remove components from the path of adverse fluid flows. Alternatively, the components in the path of the adverse fluid flows were structurally hardened or replaced more frequently to avoid failures resulting from these stresses. Placing components, such as engines or control surfaces, in non-optimal positions in order to reduce these stresses often results in reduced vehicle performance. Similarly, adding structural weight to support increased stress loads caused by the flow field vortices also results in reduced vehicle performance.

Another solution employs active or passive control flows to mitigate the effects of the adverse flow fields. However, these control flows create a need for compressed air and piping to bring the control jets to regions requiring flow-control authority. These control jets then manipulate the boundary layer with induced mixing between the primary fluid flow and the secondary fluid flow. This solution also adds structural weight to supply and support the control jets that result in reduced vehicle performance.

In either of the above described solutions, mixing is promoted by vortices trailing longitudinally near the edge of the boundary layer. Fluid particles with high momentum in the stream direction are swept along helical paths toward the duct surface to mix with and, to some extent replace low momentum boundary layer flow. This is a continuous process that provides a source to counter the natural growth of the boundary layer creating adverse pressure gradients and low energy secondary flow accumulation.

To avoid the increased weight of the supply system for control jets, synthetic jets may be employed. These synthetic jets may be those described in U.S. Pat. No. 6,722,581 entitled "SYNTHETIC JET ACTUATORS," which is hereby incorporated by reference. Synthetic jets, which may be large scale devices or small scale Micro-fabricated Electro-Mechanical Systems (MEMS) devices, are known to influence the flow over a surface, for example to control flow separation on an airfoil. A typical synthetic jet actuator comprises a housing defining an internal chamber. An orifice is present in a wall of the housing. The actuator further includes a mechanism in or about the housing for periodically changing the volume within the internal chamber so that a series of fluid vortices are generated and projected into an external environment beyond the orifice of the housing. Various volume changing mechanisms are known, for example a piston positioned in the jet housing to move so that fluid is moved in and out of the orifice during reciprocation of the piston, or a flexible diaphragm as a wall of the housing. The flexible diaphragm is typically actuated by a piezoelectric actuator or other appropriate means.

Typically, a control system is utilized to create time-harmonic motion of the diaphragm. As the diaphragm moves into the chamber, decreasing the chamber volume, fluid is ejected from the chamber through the orifice. As the fluid passes through the orifice, the flow separates at the sharp edges of the orifice and creates vortex sheets which roll up into vortices. These vortices move away from the edges of the orifice under their own self-induced velocity. As the diaphragm moves outward with respect to the chamber, increasing the chamber volume, ambient fluid is drawn from large distances from the orifice into the chamber. Since the vortices are already removed from the edges of the orifice, they are not affected by the ambient fluid being entrained into the chamber. As the vortices travel away from the orifice, they synthesize a jet of fluid, a "synthetic jet," through entrainment of the ambient fluid.

However, these devices have relatively limited capacity, in that they use only a single moving element or a moving element of limited deflection. Although high-amplitude high-frequency jets may be created synthetically, application of these devices has been restricted due to the inability to create supersonic jets and also operate in hot-gas environments (>500-deg F.). Therefore, it would be desirable to obtain increased performance of synthetic jet actuators in such environments. Accordingly, there is a need for a synthetic jet actuator having greater capacity than previous devices.

SUMMARY OF THE INVENTION

The present invention provides a system or method to actively control the primary flow adjacent to synthetic jets that substantially addresses the above-identified needs. More particularly, the present invention provides a synthetic pulsator operable to control or manipulate the primary flow adjacent to the synthetic pulsator. The synthetic pulsator uses synthetic jets to pulse a steady control fluid flow with the synthetic jet's output in order to achieve a greater penetration of the primary flow with a pulsed control jet. The steady control fluid flow may be injected directly into the synthetic jets or delivered proximate to the pulsed output of the synthetic jets in order to produce a pulsed jet. This pulsed jet is then capable of manipulating the primary fluid flow proximate to the synthetic pulsator.

The synthetic pulsator includes a synthetic jet actuator(s) operable to produce an oscillatory flow, and fluidic jet(s) operable to provide a continuous fluid flow. The oscillatory flow of the synthetic jet(s) and the continuous fluid flow of the fluidic jet(s) combine or mix to produce the pulsed jet operable to manipulate the primary fluid flow. The continuous flow may be provided at the periphery of the synthetic jet or directly into the interior chamber of the synthetic jet.

Additional embodiments may further couple the synthetic jet to a control system wherein the amplitude and frequency of the oscillatory flow can be controlled. This allows the pulsed jet to impart high amplitude high frequency eddies to the fluid flow in a controlled manner.

Another embodiment provides a flow control method capable of manipulating the primary fluid flow. As in the first embodiment, the manipulation of the primary fluid flow may involve the reduction of flow separation within the primary fluid flow, the manipulation of flow behavior of the primary fluid flow, or the manipulation of the inception point, size, and trajectory of flow field vortices within the primary fluid flow. This flow control method involves embedding fluid jet(s) and synthetic jet(s), which collectively form the synthetic pulsator, within a surface, such as an aerodynamic surface or control surface, where the fluidic jet is proximate to the synthetic jet. The fluidic jet provides a continuous fluid flow at the periphery of the synthetic jet or directly into the interior chamber of the synthetic jet. The synthetic jet generates an oscillatory flow whose amplitude and frequency may be controlled. The continuous fluid flow and oscillatory flow mix to produce a pulsed jet that in turn may manipulate the primary fluid flow over the surface.

Another embodiment may utilize a number of both fluidic jets and synthetic jets embedded within the surface to form an array of synthetic pulsators which in turn may then manipulate the primary fluid flow about the surface.

Yet another embodiment of the present invention provides an aerodynamic surface, control surface, or aircraft wherein synthetic pulsator(s) within these surfaces are operable to manipulate fluid flow over the surface. These synthetic pulsators may be placed substantially upstream of the fluid flow to be manipulated to achieve a desired fluid flow. A control system may communicatively couple to the array of synthetic pulsators. The control system may direct how the synthetic pulsators introduce secondary flows in order to achieve the desired fluid flows. Further embodiments may include a sensing system that detects the behavior of the fluid flow over the surface and provides a feedback signal to the control system which may then further manipulate the synthetic pulsators in order to achieve a desired fluid flow.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 9A-9C depict various potential sensors;

FIGS. 12-14 provide experimental results where a steady control fluid jet input into the Dual Bimorph Synthetic Pulsator (DBSP) and is perpendicular to the direction of the output of a synthetic jet.

DETAILED DESCRIPTION OF THE INVENTION

Preferred embodiments of the present invention are illustrated in the figures like numerals being used to refer to like and corresponding parts of the various drawings.

The present invention provides a system and method for manipulating aerodynamic or hydrodynamic fluid flow over a surface that substantially eliminates or reduces disadvantages and problems associated with previously developed systems and methods. More specifically, the present invention provides a system and method to manipulate flow fields with a synthetic pulsator that combines a steady fluid flow and a pulsed fluid flow provided by synthetic jet. Embodiments of the present invention may place arrays of such pulsators on surfaces bounding the fluid flow. These effectors may be operable to manipulate the flow behavior of the fluid flow, influence the inception point, size, and trajectory of flow field vortices within the fluid flow, and reduce flow separation within the primary fluid flow.

Figure 1A:
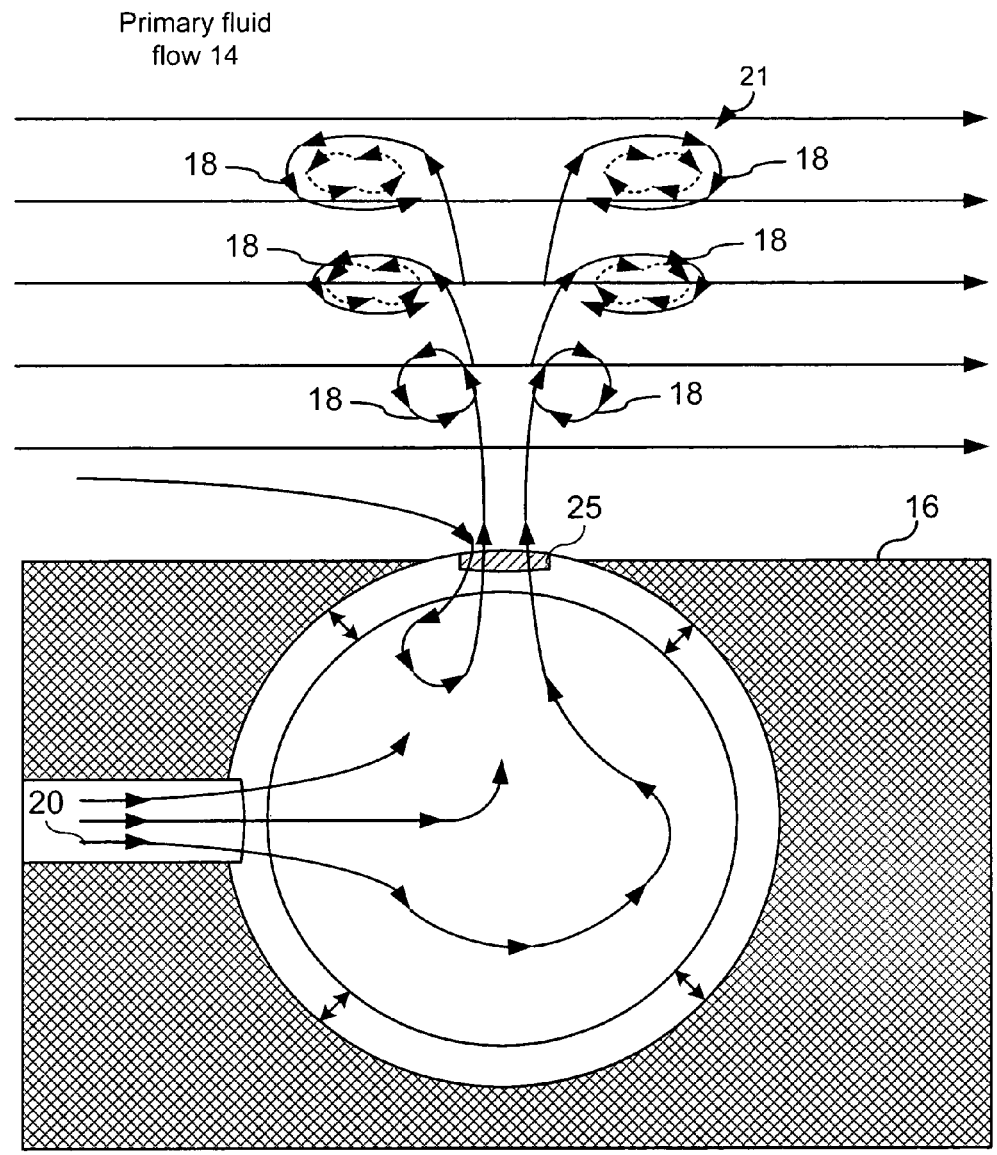
FIG. 1A depicts a synthetic pulsator operable to introduce secondary flow structures in accordance with an embodiment of the present invention.

FIG. 1A depicts an embodiment of a synthetic pulsator in accordance with an embodiment of the present invention. The synthetic pulsator may be embedded within surface 16 and is operable to produce secondary flow structures 18 within primary flow 14. The synthetic pulsator includes steady control jets 12 and synthetic jet 17. Steady control fluid jet(s) 12, as shown in FIG. 1A inject a continuous stream of fluid 20 directly into the interior chamber of synthetic jet 17. Jet(s) 12 may inject fluid directly into the synthetic jet from any location on the periphery of the synthetic jet 17. Alternatively, jet(s) 12 may provide the continuous stream of fluid outside the synthetic jet and proximate to orifice 25 where oscillatory flow 21 exits the synthetic jet.

Synthetic jet 17 may oscillate to produce oscillatory flow 21 that is operable to combine with continuous stream 20 to produce secondary flow structures 18 within primary flow 14. This oscillation may be achieved by changing the interior volume of the synthetic jet. Synthetic jets are zero net mass flow devices that can be used in a wide variety of aerodynamic applications such as boundary-layer separation control (increase in airfoils efficiency), bluff-body wake reduction and mixing enhancement (engine-noise reduction). The synthetic jets used may be a Dual Bimorph Synthetic jets (DBSJ).

DBSJs may employ multiple, for example 2 or 4 moving elements, to address the limited capacity of synthetic jets having only a single moving element.

In one embodiment a varying voltage signal is applied to the walls of the synthetic jet, where the walls are formed from a piezoelectric material, or other like material, that causes the walls to contract or expand in response to the applied signal. Thus the synthetic jet behaves like an oscillating bellows to produce the desired oscillatory flow. The amplitude and frequency of the signal applied to the synthetic jet directly effect the amplitude and frequency of the oscillatory flow 21.

The steady control fluid jets 12 introduce a steady control fluid flow 20 that combines with the oscillatory flow (pulsed output) 21 of synthetic jet 17 to create high-frequency (kHz or greater) pulsating jets that cause secondary flow structures 18 (high amplitude high frequency eddies) to form in the near wall boundary layer between fluid flow 14 and aerodynamic surface 16. The pulsating synthetic jets, when pulsed at high frequencies, reduce the required amount of air to manipulate the primary fluid flow, because pulsation (imparting high amplitude high-frequency small eddies) enhances the naturally occurring instabilities of primary fluid flow 14. Thus, control can be achieved at lower mass-flow rates through the turbulent energy cascade process. This reduces the structural weight associated with such control systems.

Figure 1B:
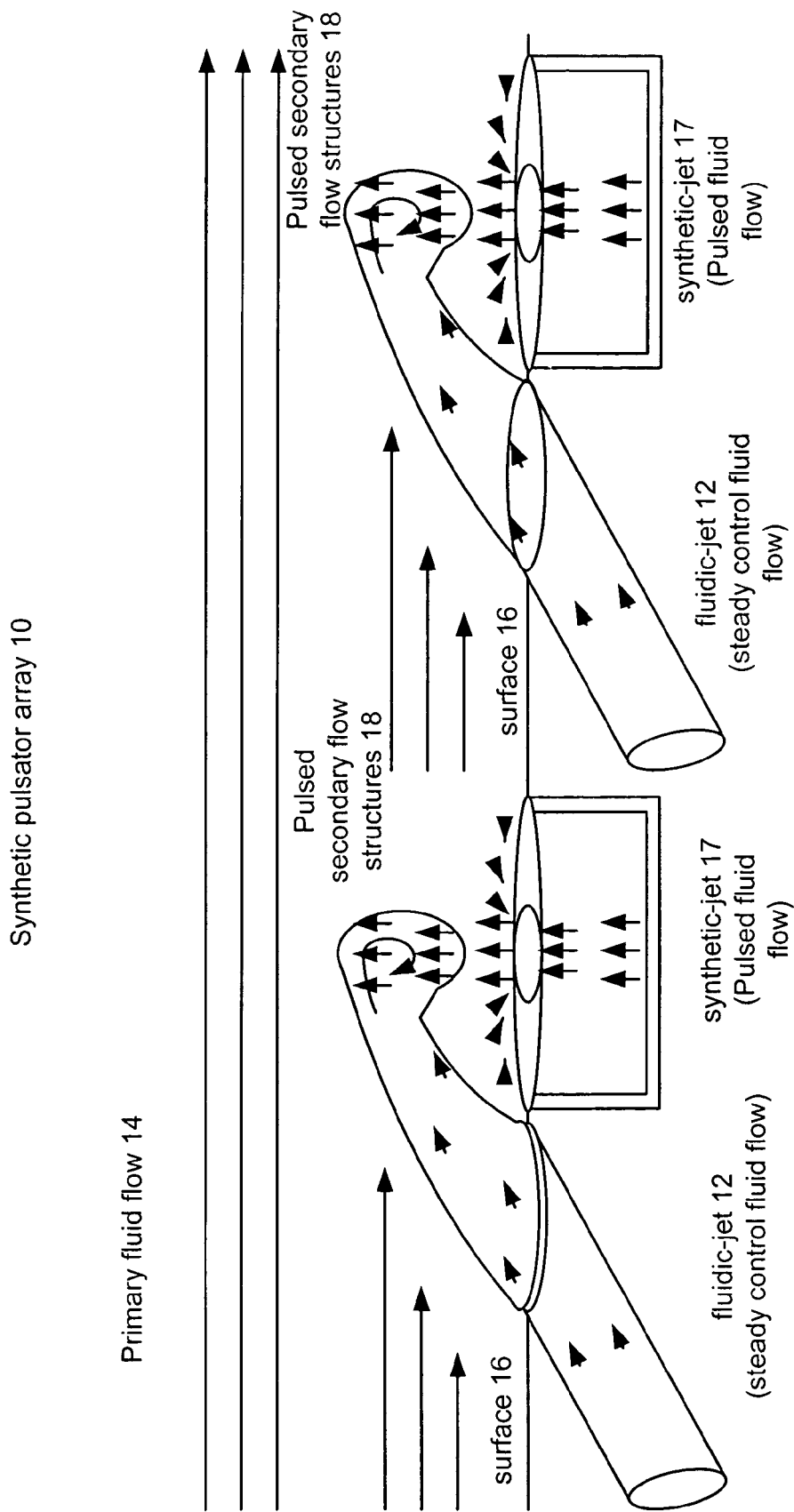
FIG. 1B depicts an array of synthetic pulsators operable to introduce secondary flow structures in accordance with an embodiment of the present invention.
Figure 1C:
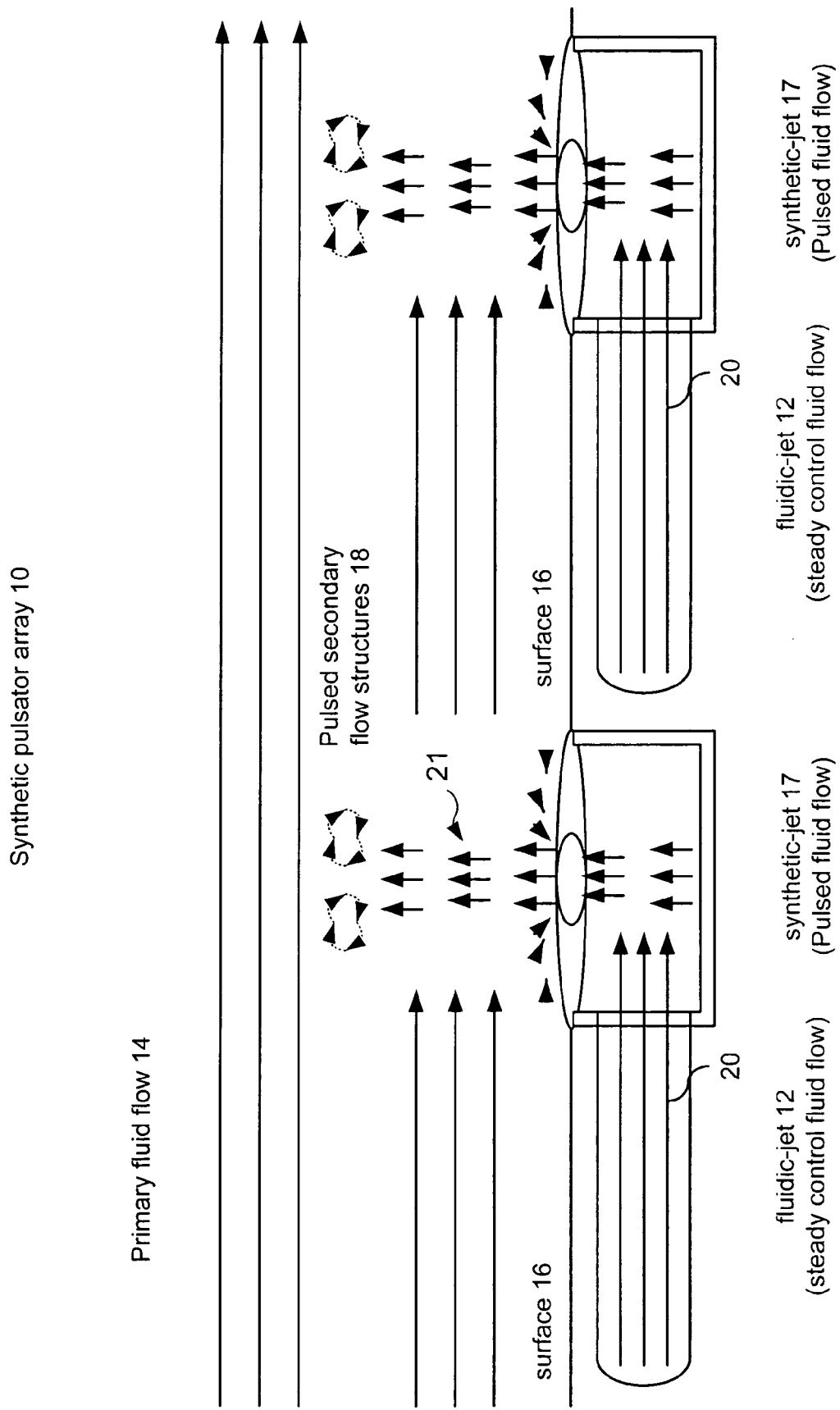
FIG. 1C depicts an array of synthetic pulsators operable to introduce secondary flow structures in accordance with an embodiment of the present invention.

FIG. 1B depicts a pulsator array 10 of steady control fluid jets 12 operable to provide a steady fluid flow at the periphery of synthetic jets 17. Here, steady control fluid jets 12 do not inject fluid directly into the chamber of the synthetic jet. Rather, steady control fluid jets 12 provide fluid flow 20 outside of synthetic jet 17. FIG. 1C depicts a pulsator array 10 of steady control fluid jets 12 operable to inject steady fluid flow 20 directly into an interior chamber of synthetic jets 17.

Figure 2:
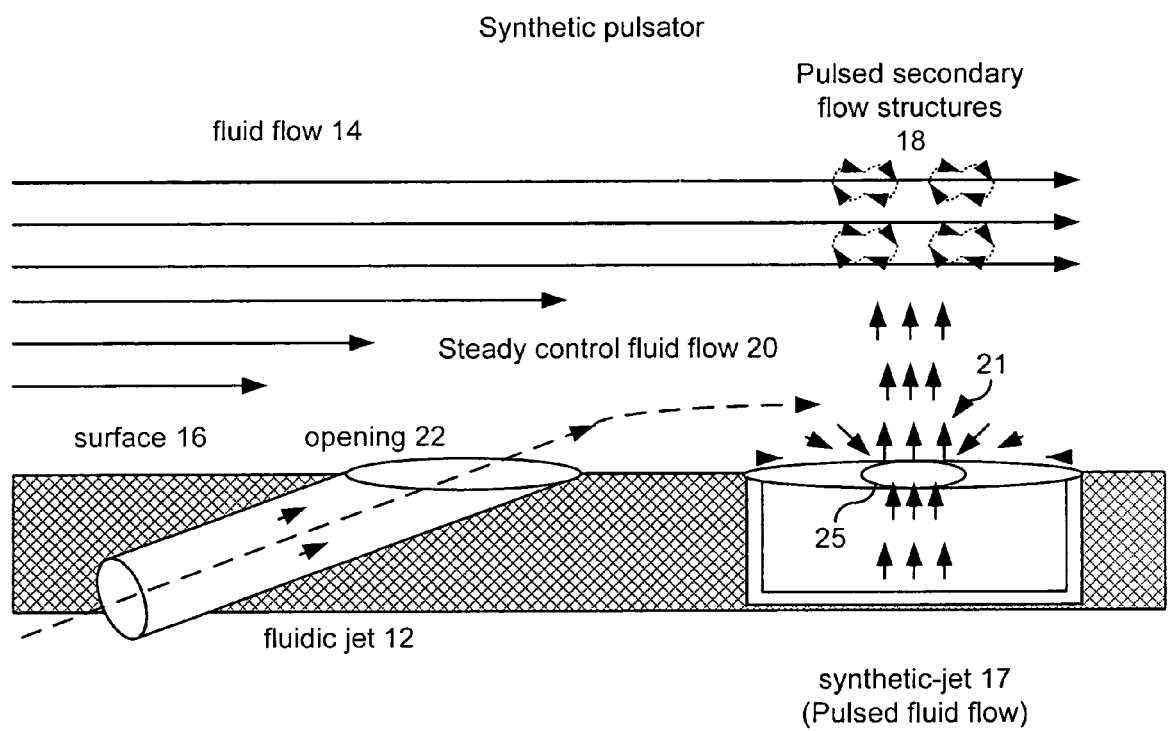
FIG. 2 provides a cross-section view of a synthetic pulsator embedded within an aerodynamic surface in accordance with an embodiment of the present invention.

As shown in FIGS. 1B, 2, and 3, steady control fluid jets 12 may be oriented generally with fluid flow 14. The pulsating jet output 21 of synthetic jet 17 may be substantially orthogonal to the steady control fluid flow 20 and primary flow 14. As shown in FIG. 2, steady control fluid jet 12 and its opening 22 are oriented at an inclination angle to produce a steady control fluid flow 20 at an acute inclination angle to fluid flow 14. This allows secondary flow structures 18 to be created and not trapped. Thus, steady control fluid jets 12 introduce secondary flow structures 18 that manipulate the flow behavior of the fluid flow, influence the inception point, size, and trajectory of flow field vortices within the fluid flow, and reduce flow separation within the primary fluid flow.

Figure 3A:
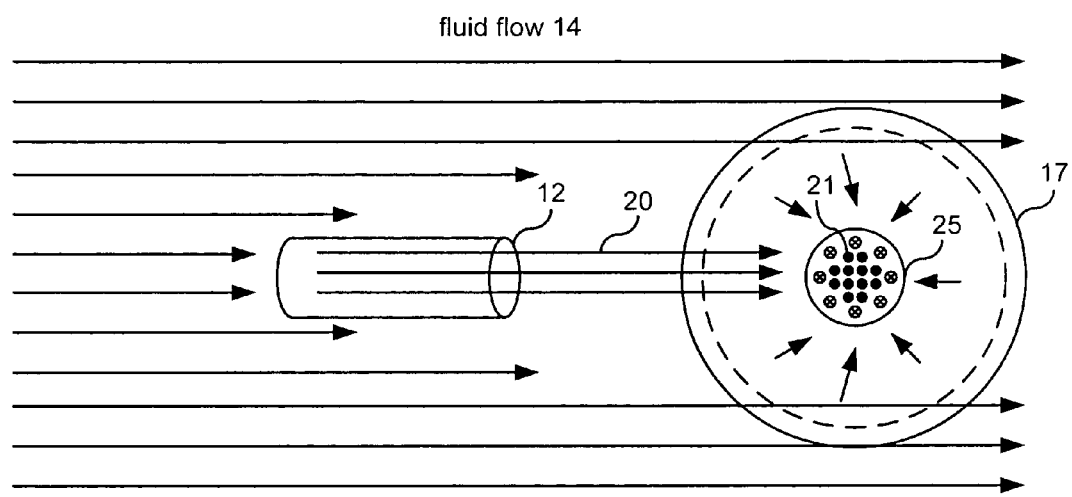
FIGS. 3A and 3B provide top down views of a synthetic pulsator embedded within a surface over which a fluid flows in accordance with an embodiment of the present invention.
Figure 3B:
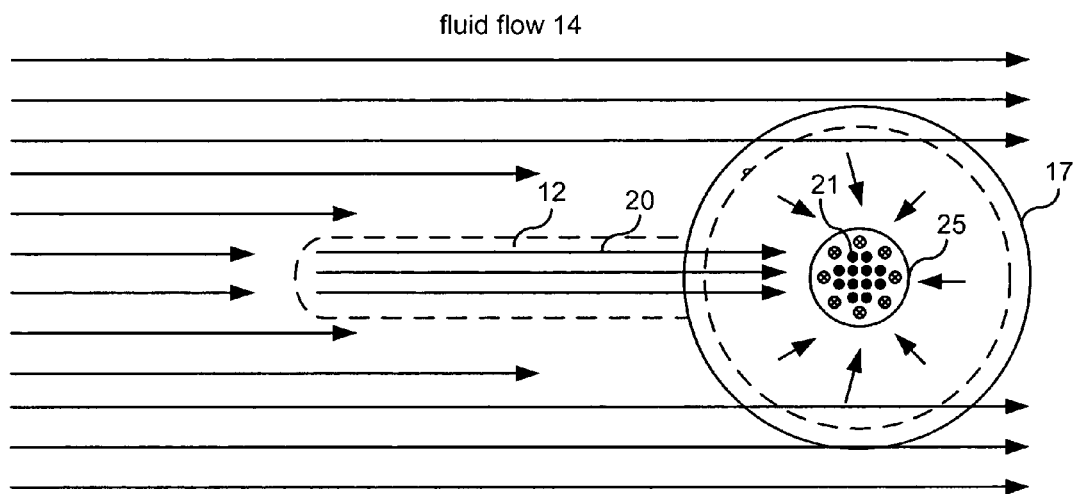

FIG. 3A shows a top down or plan view of aerodynamic surface 16 wherein steady control fluid jets 12 are oriented to produce a steady control fluid flow 20 at an azimuth angle to fluid flow 14. Steady control fluid flows 20 combine with pulsed jet 21 to induce secondary flow structures within the boundary layer between the fluid flow 14 and aerodynamic surface 16. As shown, synthetic jet 21 sucks air from fluid flow 14 or 20 into an inner cavity, then synthetic jet 17 expels pulsed output 21 through orifice 25 to manipulate fluid flow 14 and its boundary layers. FIG. 3B shows a top down view of aerodynamic surface 16 wherein steady control fluid jets 12 inject fluid directly into an interior chamber of synthetic jet 17.

Figure 4:
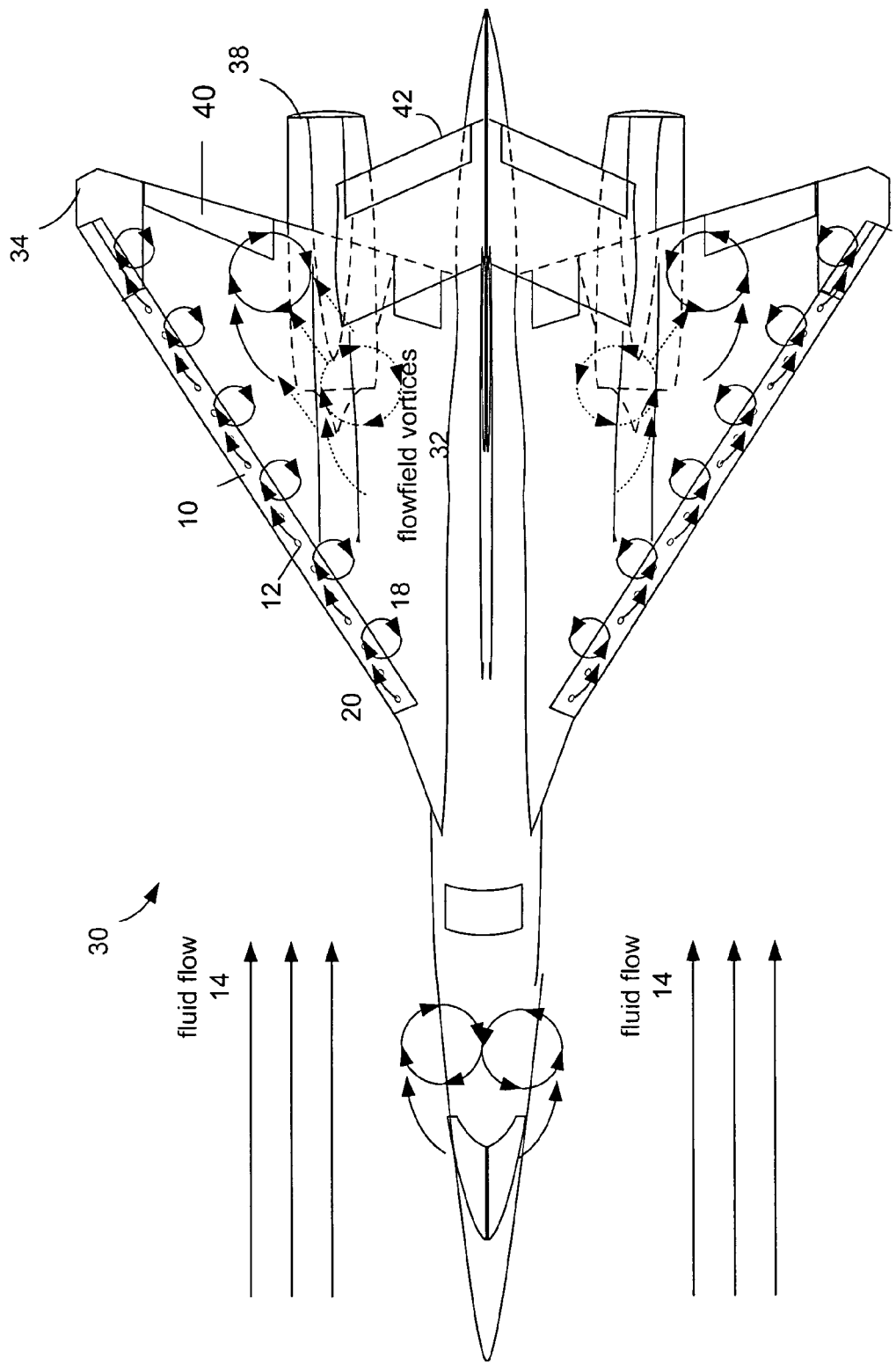
FIG. 4 depicts an aircraft utilizing an array of synthetic pulsators to influence the flow-field over an aircraft in accordance with an embodiment of the present invention.

One potential implementation applies these pulsator arrays to a vehicle, such as but not limited to aircraft. In FIG. 4, aerodynamic surface 16 is located on an aircraft. Other aerodynamic vehicles such as automobiles, trucks, trains, and boats that are sensitive to aerodynamic constraints may have the pulsator array applied to address aerodynamic or hydrodynamic concerns and improve the performance of these vehicles.

FIG. 4 depicts aircraft 30 that experiences flow field vortices 32. These flow field vortices are generated from the trailing edge of external components on the aircraft. These flow field vortices can adversely affect downstream components of the aircraft such as but not limited to engines, weapons, fuel or storage nacelles, after body structures, such as the tail or empennage, control surfaces, canards, wings, air intake inlets, such as engine air inlets or sensor air inlets, or other downstream components known to those skilled in the art.

FIG. 4 specifically shows that discontinuities in the aircraft's surface, such as those at the cockpit, can generate flow field vortices 32. Wing 34 is also shown to generate flow field vortices 32. As shown, pulsator array 10 of steady control fluid jets 12 and synthetic jets 17, has been placed on the leading edge of wing 34. These introduce high frequency pulsed jets that in turn induce secondary flow structures 18. These secondary flow structures may influence the inception point, size, and trajectory of flow field vortices away from downstream components as shown. Flow field vortices 32, located over wing 34, if left unimpeded, would buffet empennage 42. However, these vortices are shifted outwards by the effect of the secondary flow structures 18. By reducing the buffeting and fatigue caused on downstream components, the structural requirements for these components may be reduced. Additionally, should the flow field vortices be ingested within an air inlet potentially hazardous stresses can be placed on the aircraft engine resulting in stalling or component failure. For example, turbine blades within the aircraft engine may be severely stressed when ingesting flow field vortices. Thus, the performance of aircraft 30 may be improved significantly by actively shedding the flow field vortices 32 in such a manner to reduce stresses on downstream components.

Figure 5A:
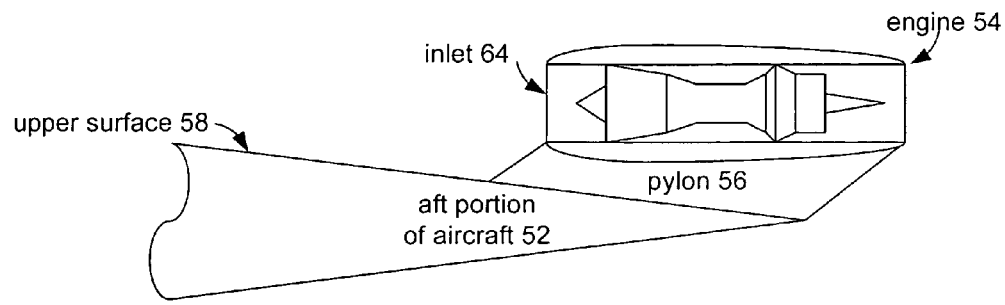
FIGS. 5A, 5B and 5C depict a cross section of a next generation aircraft, such as a blended wing body, having synthetic pulsator arrays operable to minimize the impact of boundary layers on engines located near or submerged within the upper surface of the airframe.
Figure 5B:
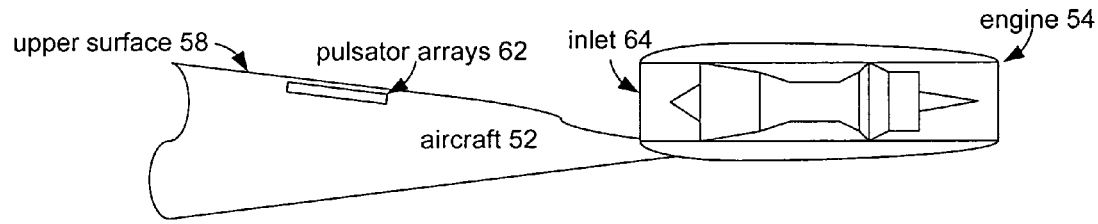
Figure 5C:
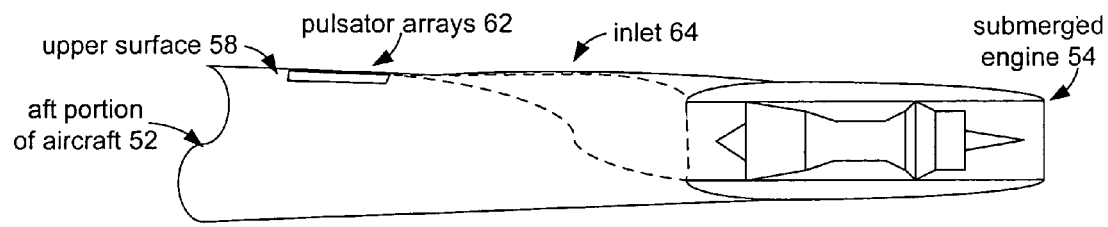

FIGS. 5A, 5B and 5C, depict cross-sections of a next-generation aircraft such as the blended wing body (BWB) where the engine inlets are placed near the upper surface or submerged within the upper surface on the aft section of the aircraft. Here aircraft 52 has the engine 54 located near the aft portion of the aircraft. Actively controlling the flow field may greatly improve the performance of aircraft that locate engines near the upper surface of or submerge the engines within the airframe. FIG. 5A depicts engine 54 being mounted on a pylon 56 but located near the upper surface 58 of aircraft 52. Mounting above but near the upper surface avoids some problems associated with ingesting boundary layer flow (low energy boundary layer air) at or near upper surface 58. FIG. 5B depicts an instance where engine 54 is mounted at the surface to eliminate the pylon or nacelle supporting engine 54. By eliminating the pylon or nacelle 56, a smaller surface area is experienced, thus reducing weight and drag of the aircraft 52. FIG. 5C depicts the instance where an engine 54 is submerged within the upper surface 58 of aircraft 52. In the cases presented in FIGS. 5B and 5C, pulsator arrays 62 are used to actively control and manipulate the boundary layer as seen by inlet 64 of engine 54. These pulsator arrays 62 may use continuous or pulsating air jets for boundary layer control. These micro-jets manipulate the shedding, size, and trajectory of vortices as well as the boundary layer to improve the performance of engine 54. Previous solutions may have merely used static vortex generators to manipulate the boundary layer and flow structures ingested by the engines. Although these engines may still experience airflow distortion, the micro-jets located forward of the inlets to engine 54 can significantly reduce distortion of the airflow ingested by these engines. This may reduce the portion of the lower energy boundary layer ingested by an engine located near the surface or submerged within the surface of the airframe. By reducing the amount of low energy boundary layer air ingested by the engine, the present invention can significantly improve the performance of a vehicle such as a next-generation aircraft like the BWB where engine inlet distortion can be controlled.

Figure 6:
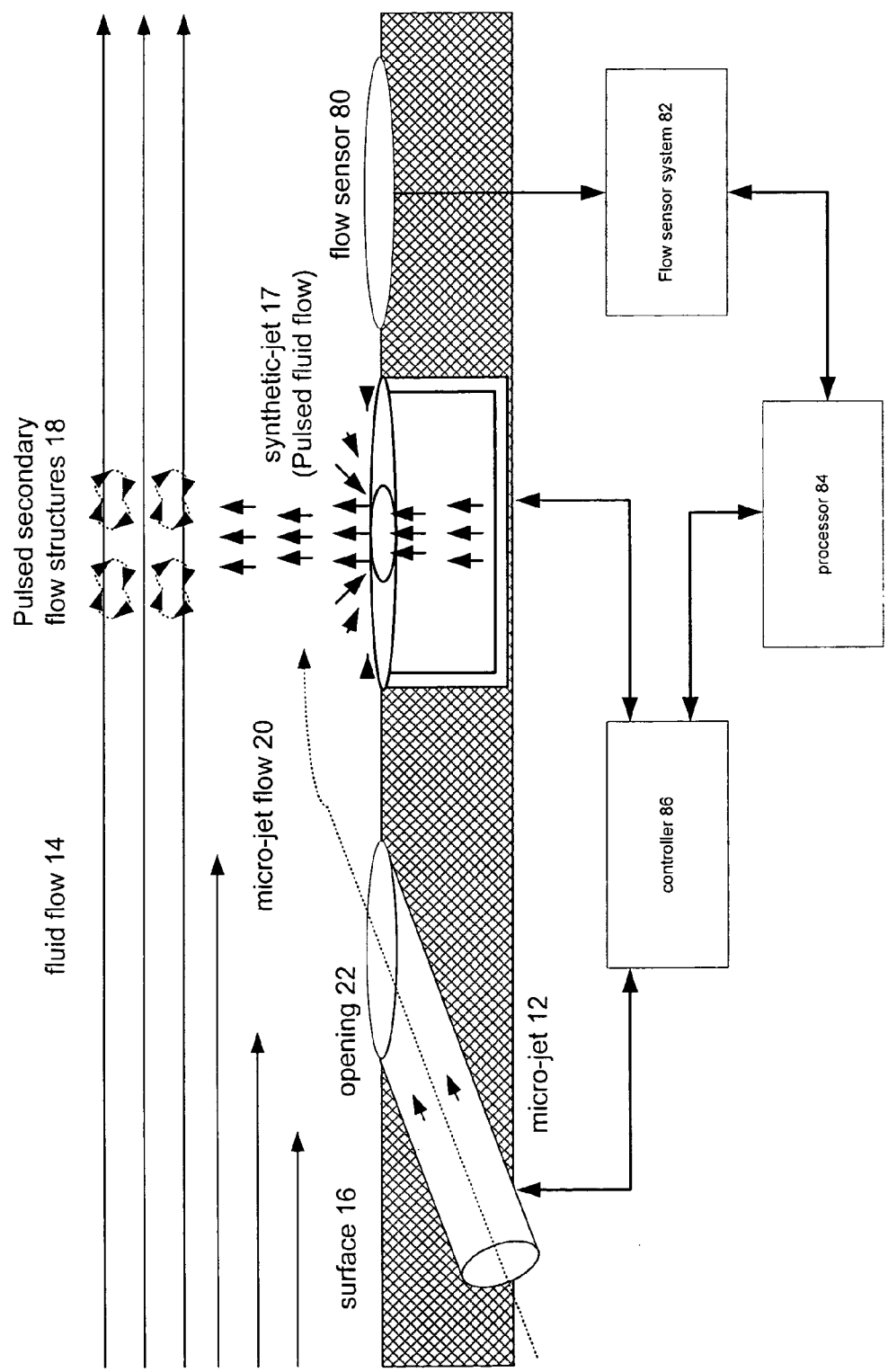
FIG. 6 provides a functional diagram of an aerodynamic surface or control surface operable to sense flow conditions and influence flow-field vortices over the aerodynamic surface in accordance with an embodiment of the present invention.

FIG. 6 depicts an aerodynamic surface or control surface 16. Here, pulsator arrays 10 of steady control fluid jets 12 and synthetic jets 17 are within surface 16. Although a synthetic pulsator array similar to that of FIG. 1B is shown, the pulsator array may be similar to that of FIG. 1C or a combination of the arrays of FIGS. 1B and 1C. Steady control fluid jets 12 introduce steady control fluid flow 20 and synthetic jets 17 introduce pulsed jet 21. The steady control fluid flow 20 and pulsed jet 21 combine to produce a high frequency pulsed jet that is operable to create secondary flow structures 18 in the near wall boundary layer. The secondary flow structures 18 can reduce boundary layer separation over the aerodynamic surface.

A control system may be operably coupled to steady control fluid jets 12 and synthetic jets 17. This control system is operable to actively direct steady control fluid jets 12 and synthetic jets 17 to introduce secondary flows 18 in order to achieve a desired fluid flow 14 over aerodynamic surface 16. Additionally, this control system may control the amplitude and frequency of the output of synthetic jet 17. This may be achieved by controlling the amplitude and frequency of the signal used to drive the diaphragm or piezoelectric material of the synthetic jet.

This active control may be further complemented by a sensing system 82 operably coupled to the processor 84 and controllers 86. This sensing system may employ flow sensors 80 located at various locations along aerodynamic surface 16. These flow sensors are operable to detect the characteristics of fluid flow 14 over aerodynamic surface 16. Sensor outputs are provided to flow sensor system 82 and processor 84. Processor 84 compares the detected fluid flow characteristics over aerodynamic surface 16 with a desired fluid flow characteristic. Then processor 84 will actively direct micro-jet controller 86 to introduce secondary flows 18 to achieve a desired fluid flow over aerodynamic surface 16.

Processor 84 and controller 86 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

As previously stated, these steady state control jets, synthetic jets and flow sensors may be incorporated in any aerodynamic surface. However, in many instances, more value may be realized by placing these systems within receptive zones of the aerodynamic surface such as the leading edge of the aerodynamic surfaces. The desired fluid flow may avoid having flow field vortices adversely impact downstream components. The desired fluid flow also reduces the fatigue or buffeting of downstream components.

The steady control fluid jets and synthetic jets may be very-small-scale devices. In some embodiments theses jets are on the order of one-tenth of the boundary layer thickness. These may be miniature vortex generators or vortex generator jets fabricated in many ways and applied as an applique to or cast into the surface. The steady control fluid jets may be miniature fluidic jets that introduce momentum in the form of steady or pulsed control flows. These fluid flows may be continuous or pulsed and combine with pulsed outputs of the synthetic jets. The control jets may take bled air from the primary flow associated with an engine. Other similarly sized jets, known to those skilled in the art, may also be used as the steady control fluid jets.

Figure 7A:
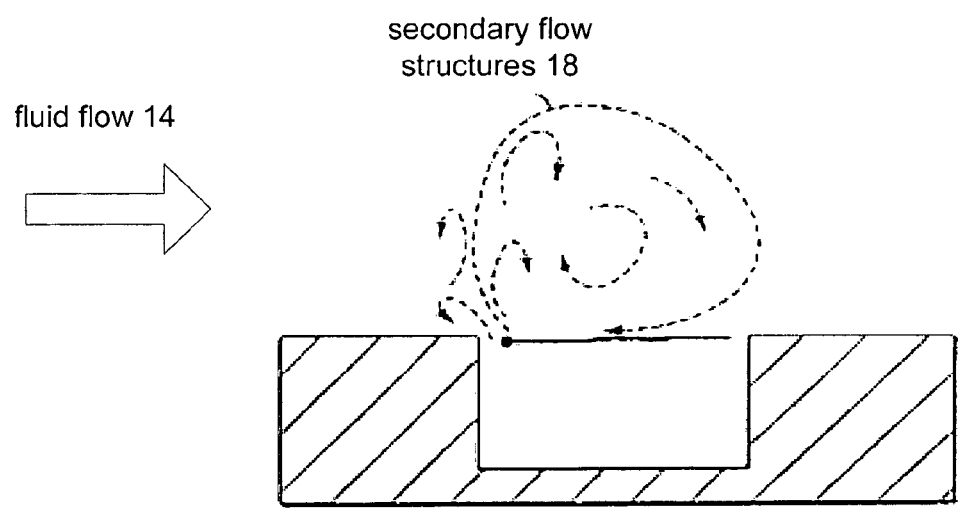
FIGS. 7A-7D depict various potential micro-jets or like devices operable to provide a steady fluid flow input to the synthetic pulsator.
Figure 7B:
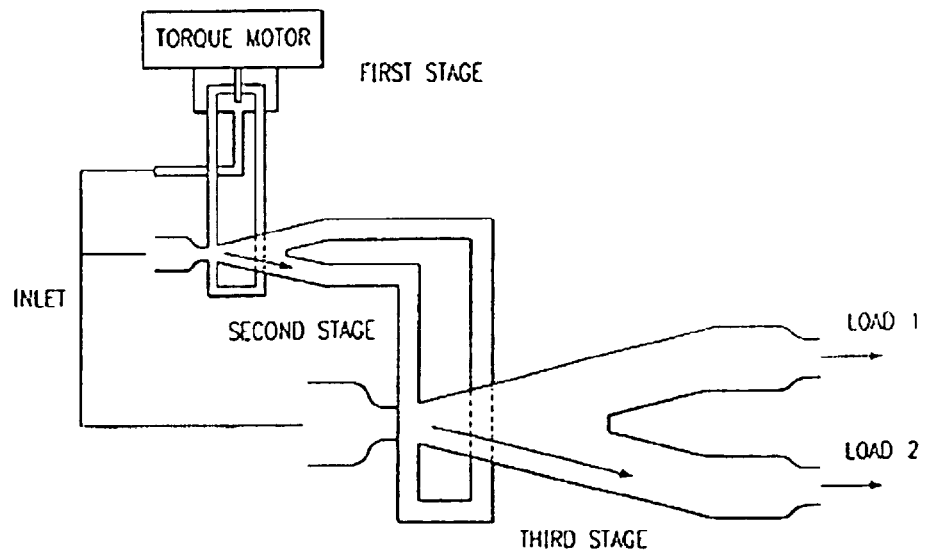

FIGS. 7A-7D illustrate many examples of micro fabricated electromechanical structures (MEMS) which may be used as these control jets. FIG. 7A depicts a fluidic effector creating secondary flows structures 18 as primary fluid flow 14 passes over a fluidic effector, such as those taught in U.S. Pat. No. 6,722,581. FIG. 7B depicts a pulsing effector, such as those taught in U.S. Pat. No. 6,722,581. A fluidic oscillator alternates flow between two outflow legs by injecting high pressure on either side of the nozzle orifice. Injecting at Input 1 causes flow to exit the device at Output 2, and injecting at Input 2 causes flow to exit the device at Output 1. The Input flow can come from a like, but smaller device (Second Stage) or from a mechanically driven valve (First Stage).

Figure 7C:
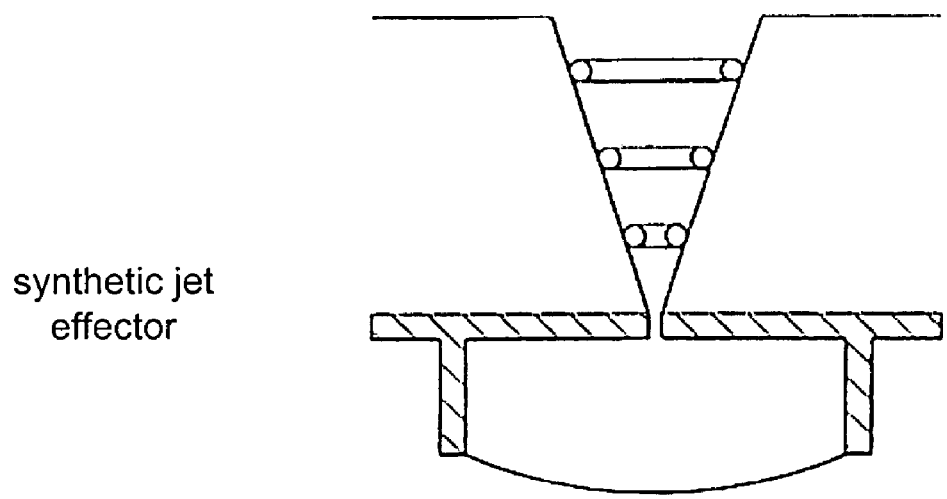
Figure 7D:
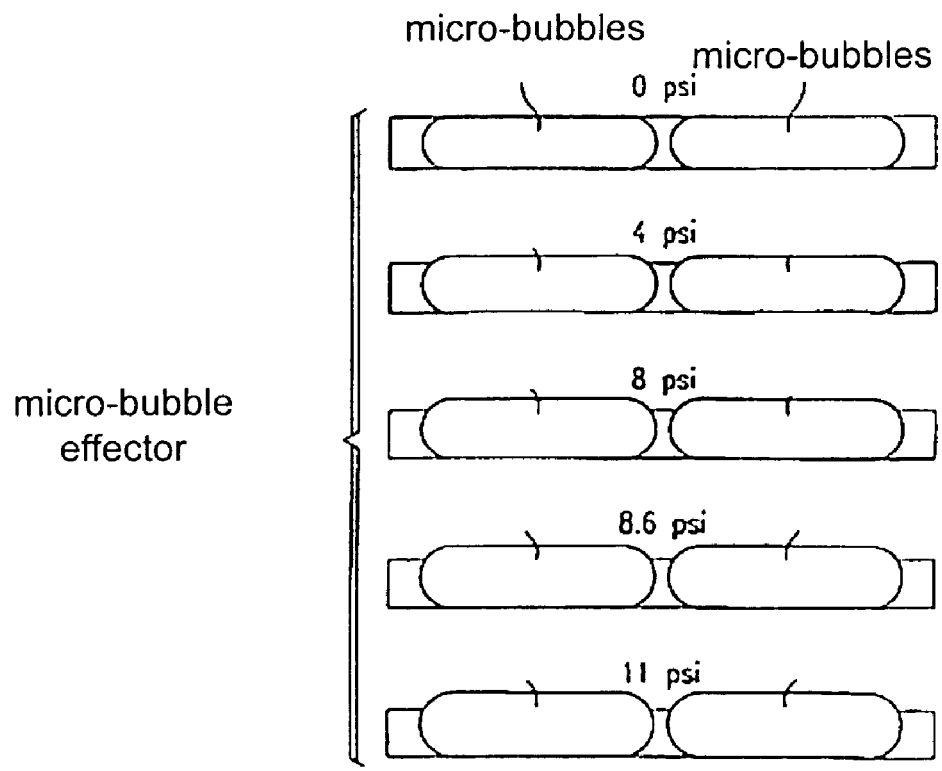

FIG. 7C depicts a synthetic jet effector such as those taught in U.S. Pat. No. 6,722,581. This type of effector uses a vibrating diaphragm, which bounds a cavity to generate an air jet. The oscillating surface draws fluid into the cavity from all directions and then expels it in a narrow jet. The resultant pulsed jet has no net mass flow. FIG. 7D presents a micro-bubble effector where micro-bubbles expand based on internal pressure to manipulate secondary flow structures 18. The effectors listed above are examples of possible MEMS devices, which may be used to manipulate primary fluid flow.

Figure 8:
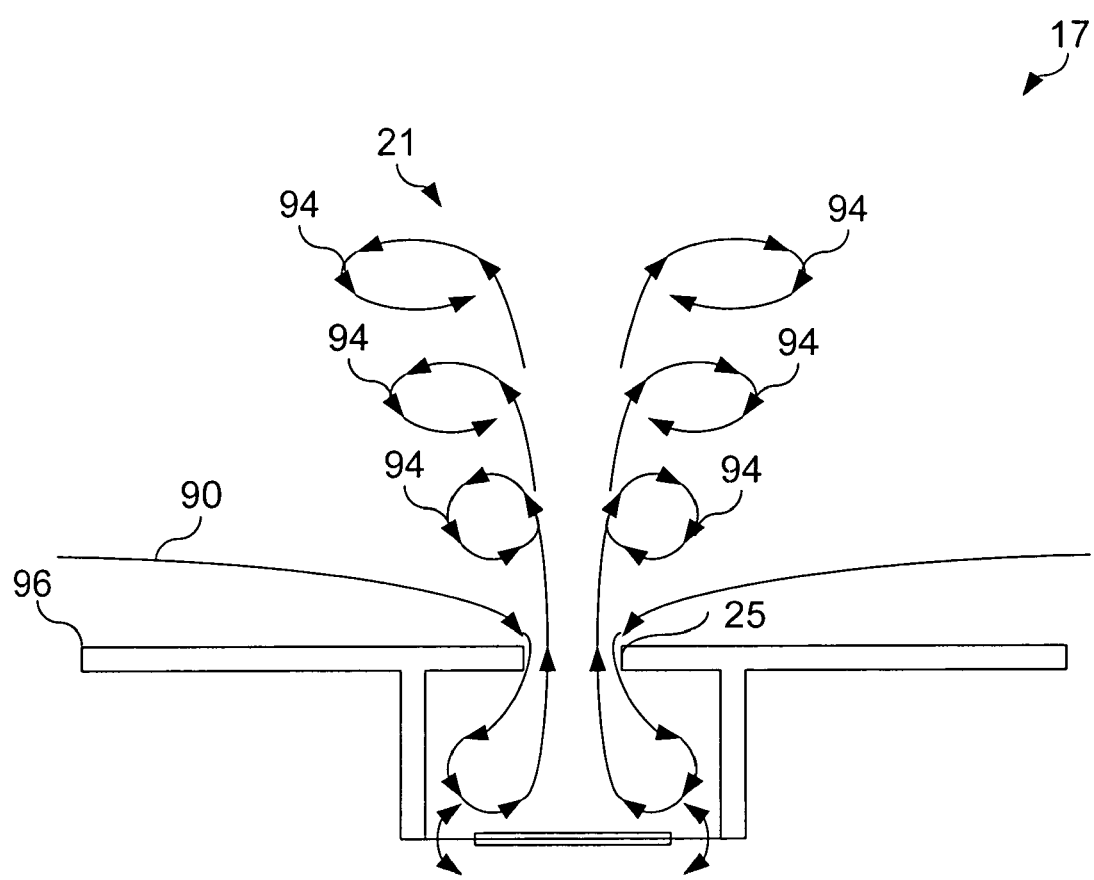
FIG. 8 depicts a potential synthetic jet actuator to provide a pulsed fluid flow input to the synthetic pulsator in accordance with an embodiment of the present invention.

FIG. 8 describes in further detail how synthetic jets operate. Although one specific synthetic jet is illustrated here, other synthetic jets known to those skilled in the art may be used as well. Synthetic jet actuators may be used within the synthetic pulsators provided by embodiments of the present invention. The term "Synthetic Jet" refers to a flow created with no net mass flux. Flow 90 is alternately pushed in and out of orifice 25. The exiting fluid separates and rolls into a vortex ring 94 and propagates away from the exit plane 96 due to self induced velocity. Synthetic jets have the unique property that they are zero-mass-flux in nature; i.e., they are synthesized from the working fluid of the flow system in which they are deployed. Thus, in contrast to conventional continuous or pulsed jets, synthetic jets transfer linear momentum to the flow without net mass injection across the flow boundary. The zero-net-mass nature of a synthetic jet makes them attractive for flow-control applications. Synthetic jets are able to provide momentum flux, alter pressure distribution, and to introduce arbitrary scales to another flow such as steady control flow 20 or primary fluid flow 14.

Referring to FIG. 6, sensor system 82 may receive input from conventional flow sensors or micro fabricated electro-mechanical sensor devices such as those illustrated in FIGS. 9A, 9B and 9C. FIG. 9A depicts sensor 80 as a MEMS sheer sensor. This device functions in a manner similar to a hot-film sheer stress sensor. A small surface flush with the duct wall is maintained at a constant temperature. The heat flex at the duct wall is then measured. This heat flux can be calibrated to sheer stress.

FIG. 9B depicts sensor 80 as a MEMS pressure sensor. FIG. 9C depicts sensor 80 as a velocity sensor. This device functions in a manner similar to hot-wire anemometers. Electric current is passed through a metal element exposed to the fluid flow. The fluid flow convectively cools the element, effecting a change in its electric resistance. This change in resistance can be related to the velocity magnitude at the sensor through calibration. These sensors may be incorporated into surface 16 and communicate to sensor system 82, processor 84 and controller 86.

Another embodiment provides an aerodynamic control surface that actively manipulates the inception point, size and trajectory of flow field vortices and/or boundary layer separation over the aerodynamic control surface. This aerodynamic control surface will have pulsator arrays operable to introduce secondary flows in the near wall boundary layer. These secondary flows reduce boundary layer separation over the aerodynamic control surface. By reducing boundary layer separation, the overall size of the control surface as well as support for the control surface may be reduced. In an aircraft, for example, this may result in significant weight reduction as the structural requirements associated with the aircraft control surfaces and their control systems may be reduced. A control system operably coupled to the pulsator arrays may direct pulsator arrays to introduce secondary flows in order to achieve desired fluid flow over the control surface.

Figure 10:
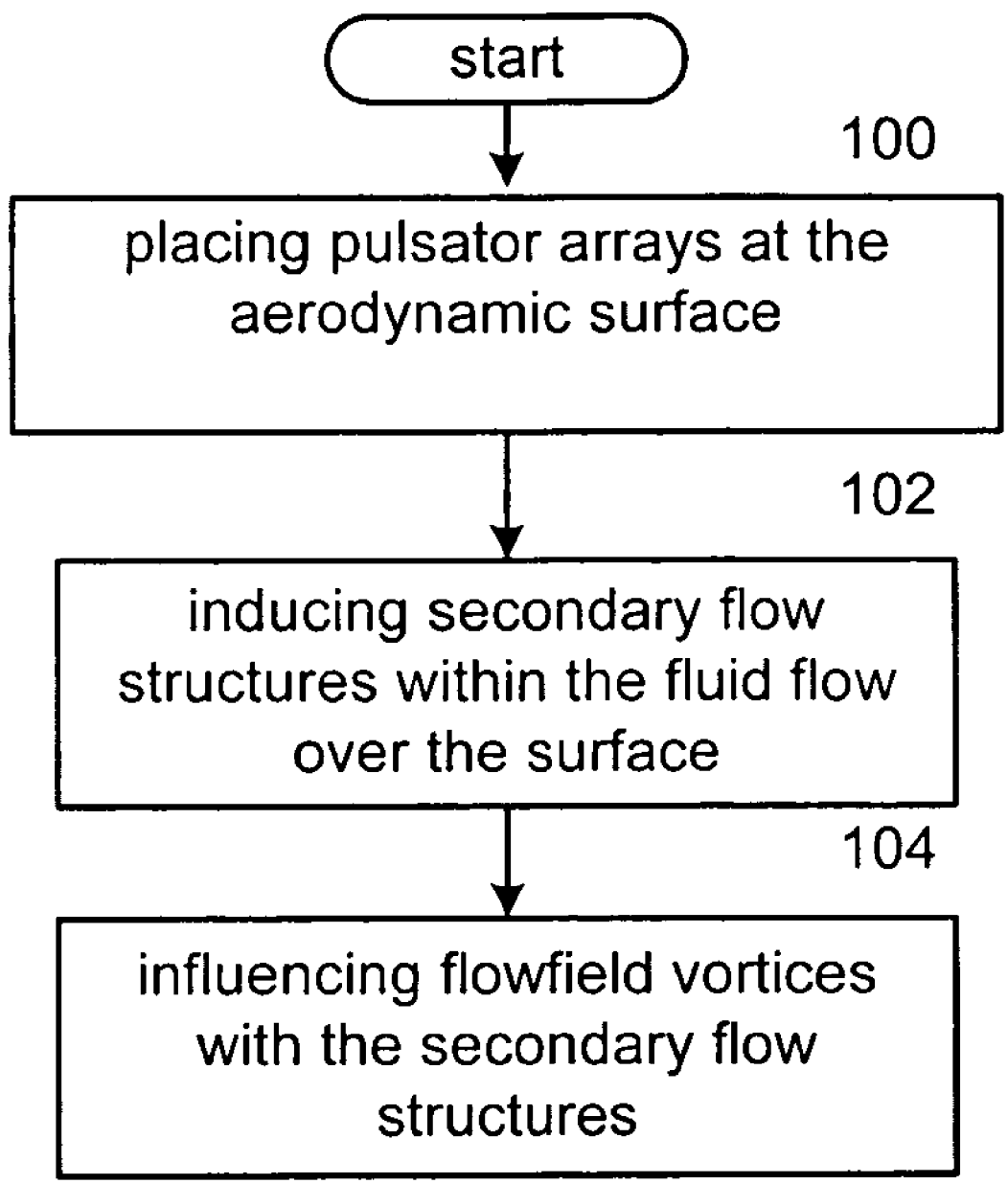
FIG. 10 provides a logic flow diagram illustrating one embodiment of the present invention.

FIG. 10 provides a logic flow diagram illustrating a method associated with the present invention. Generically, this method involves placing the synthetic pulsator arrays at a surface in step 100. Then, in step 102, secondary flow structures are induced within the fluid flow over the aerodynamic surface by the pulsator arrays. This involves the combination of both steady control flows from fluidic jets and pulsed flows from synthetic jets. As previously stated, these may combine to form high frequency pulsating jets operable to induce secondary flow structures within the fluid flow over the surface. In step 104, the flow field over the surface is influenced by the secondary flow structures. The secondary flow structures may specifically influence the inception point and trajectory of the flow field vortices or boundary layer separation.

Figure 11:
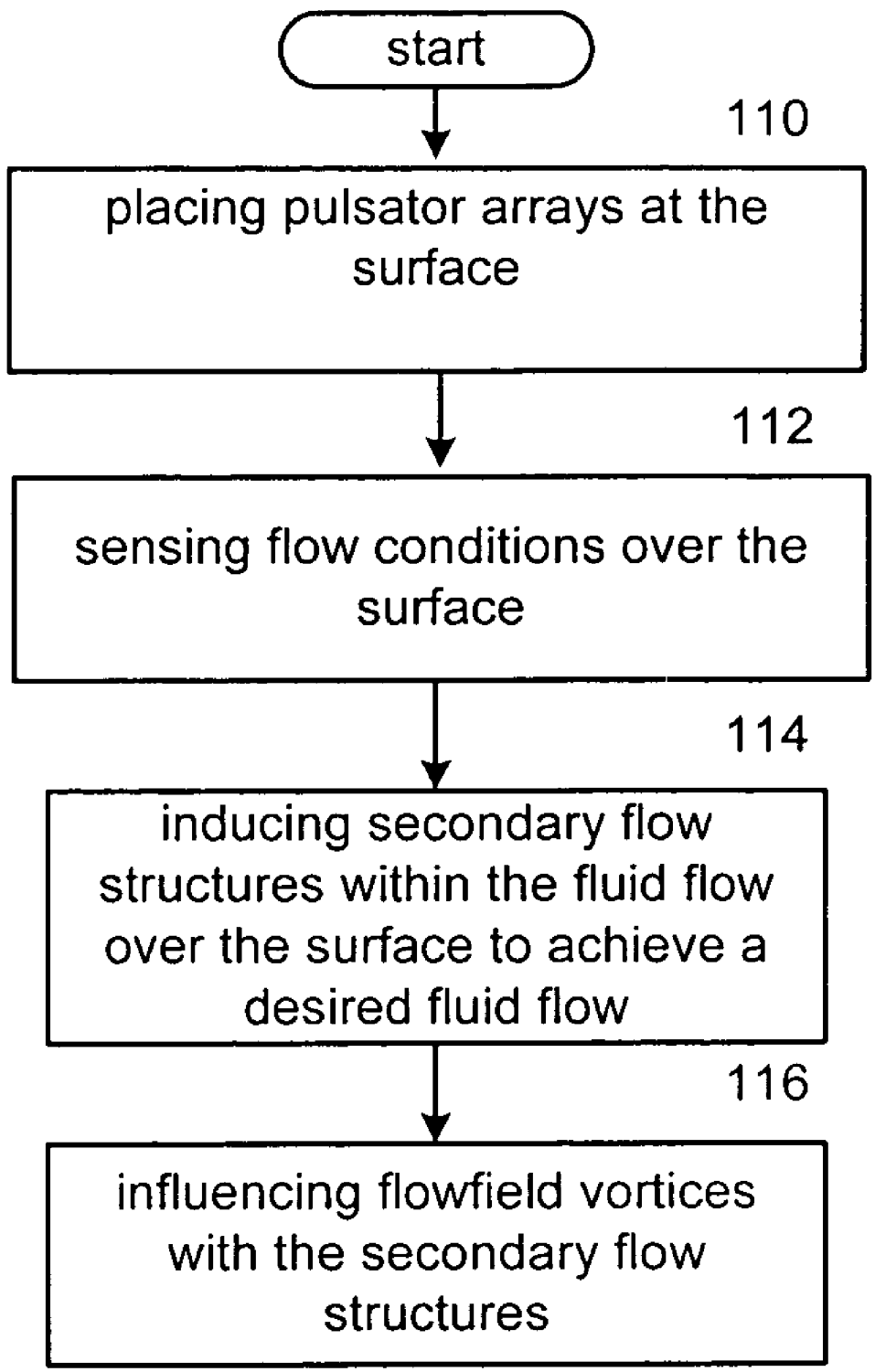
FIG. 11 provides a logic flow diagram depicting one methodology for influencing flow-fields in accordance with the present invention.

FIG. 11 provides a second logic flow diagram depicting a second flow control methodology associated with the present invention. In step 110, pulsator arrays are placed at the aerodynamic surface. Additionally, sensors at the aerodynamic surface sense flow conditions over the aerodynamic surface in step 112. The sensed flow conditions are used to direct pulsator arrays placed in step 110 to induce secondary flow structures in step 114 within the fluid flow in order to achieve the desired fluid flow. As in FIG. 10, the induced secondary flow structures influence the flow field vortices within the fluid flow in Step 116.

Figure 12:
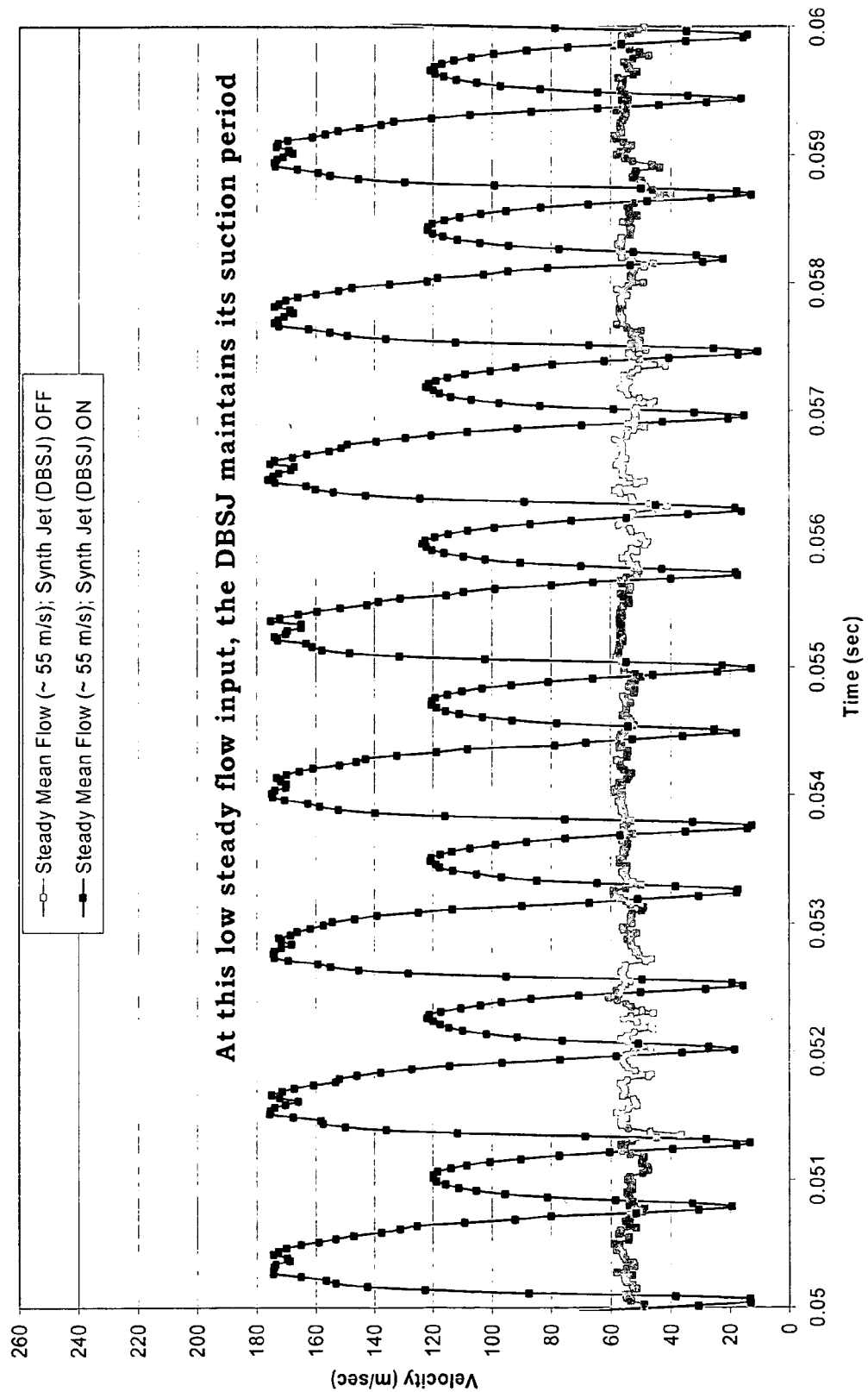
Figure 13:
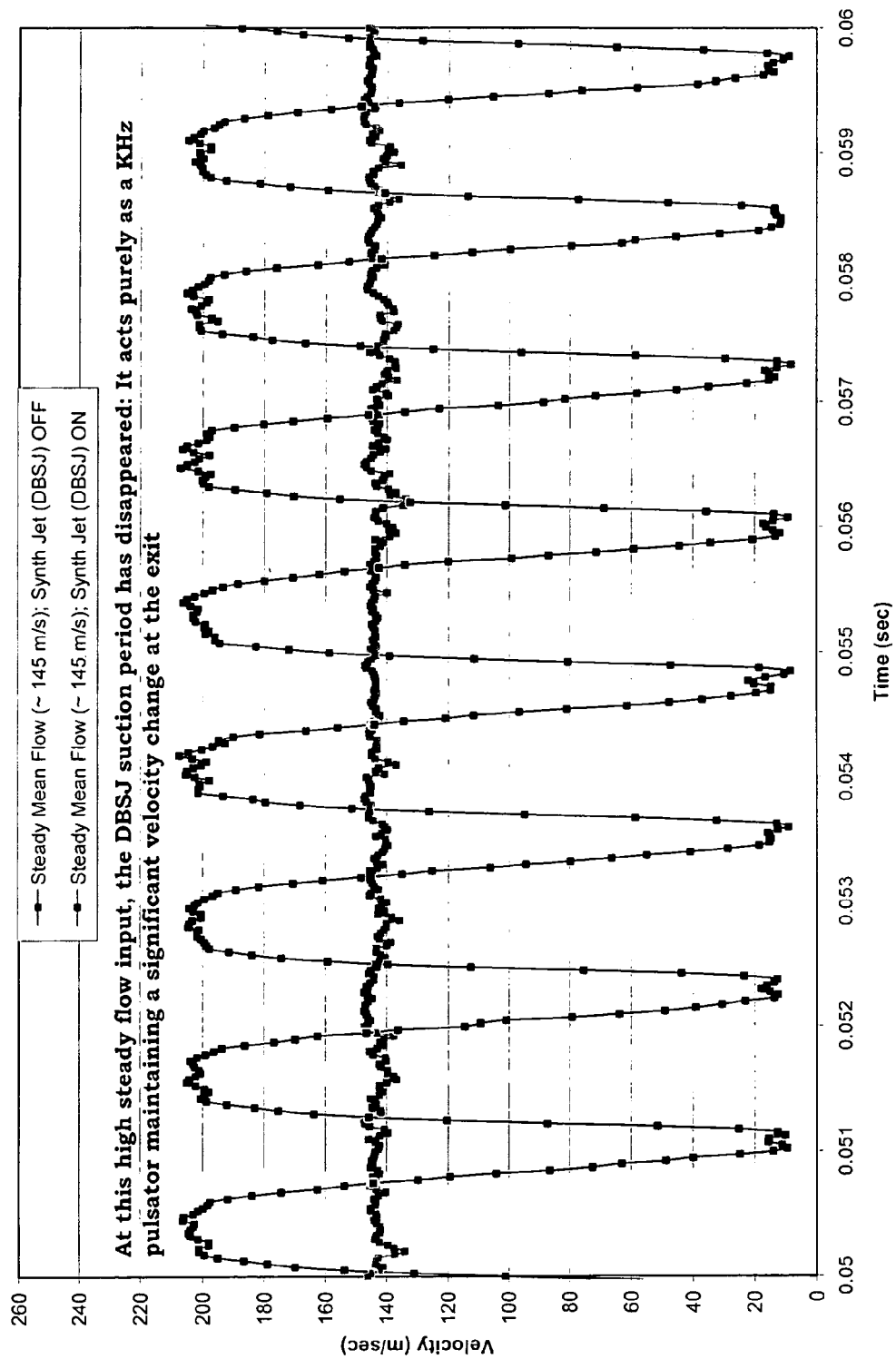

FIGS. 12 through 14 depict the experimental results where the steady-jet input is perpendicular to the single-hole output of the DBSJ. In this case the data show the effective input velocity regime into the DBSJ to operate as Dual Bimorph Synthetic Pulsator (DBSP). It should be noted that the steady control jet flow although perpendicular to the pulsed jet output of the synthetic jet need not be so limited. Other geometries, although not tested in the experiments whose results are presented herein are conceivable. These results clearly show that the Synthetic Pulsator provided by embodiments of the present invention is effective up to 200 m/s air velocity. The important point to note here is that for the case of 140 m/s steady inlet flow, the DBSP has increased the output peak velocity to approximately 210 m/s and also is capable of producing 1 KHz pulsation with a 200 m/s delta in velocity during one operation cycle.

Embodiments of the present invention may enable new and improved designs of low-observable tactical aircraft by allowing unconventional aerodynamic shapes. Low-observable design in part takes into consideration such as detection by radar and the radar cross-section associated with a low-observable aircraft. This is in part achieved by the weight reduction associated with synthetic pulsator flow control systems when compared to conventional systems.

Additionally, flow control can reduce cyclic fatigue of components located within fluid flow. Stress peak amplitudes experienced by a component within the fluid flow for a normal flow can be greatly reduced by reducing or eliminating interactions between flow field vortices and structural components.

The present invention may be used to improve flow behavior in a hydrodynamic application. This may minimize head loss in a piping system, reduce flow noise within a piping system or over a submerged structure or to control and manipulate hydrodynamic flow about a watercraft for direction and thrust control.

Further embodiments of the present invention may include air-handling units such as HVAC systems, chemical processors, automobile air intake manifold or biomedical applications. However, the present invention should not be limited to these applications.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A flow control method, comprising:
   embedding at least one synthetic jet within a surface, the at least one synthetic jet having a chamber with an inlet port and an orifice;
   generating at least one continuous fluid flow with at least one fluidic jet and discharging the continuous fluid flow through the inlet port into the chamber;
   generating at least one oscillatory flow within the chamber;
   mixing in the chamber the continuous fluid flow with the oscillatory flow to produce a pulsed jet;
   flowing a primary fluid flow over the surface; and
   discharging the pulsed jet through the orifice into the primary fluid flow flowing over the surface to manipulate the primary fluid flow.

2. The method of claim 1, further comprising controlling an amplitude and frequency of the oscillatory flow to manipulate an amplitude and frequency of the pulsed jet.

3. The method of claim 1, wherein the pulsed jet is operable to impart high amplitude high frequency eddies to the primary fluid flow.

4. The method of claim 1, wherein the at least one synthetic jet is operable to provide a KHz pulsed jet.

5. The method of claim 1, wherein the at least one fluidic jet provides the continuous fluid flow substantially orthogonal to the pulsed jet of the at least one synthetic jet.

6. A flow control method operable to manipulate a primary fluid flow, comprising:
  embedding at least one synthetic jet within a surface, the at least one synthetic jet having a chamber with an inlet port and an orifice;
  flowing a primary fluid flow over the orifice and substantially parallel with the surface;
  generating at least one oscillatory flow within the chamber;
  generating at least one continuous fluid flow and flowing the at least one continuous fluid flow through the inlet port into the chamber;
  mixing in the chamber the continuous fluid flow with the oscillatory flow to produce a pulsed jet; and
  discharging the pulsed jet from the chamber through the orifice into the primary fluid flow over the surface to manipulate the primary fluid flow.

7. The method according to claim 6, further comprising sensing a characteristic of the primary fluid flow as it flows across the surface and controlling the oscillatory flow in response to the characteristic sensed to manipulate the pulsed jet.

8. The method according to claim 7, wherein controlling the oscillatory flow comprises controlling the amplitude and frequency of the oscillatory flow.

9. A method of controlling aircraft flight, comprising:
  embedding at least one synthetic jet within an aerodynamic surface of the aircraft, the at least one synthetic jet having a chamber with an inlet port and an orifice;
  flowing a primary airflow over the aerodynamic surface;
  generating within the chamber at least one oscillatory flow from the at least one synthetic jet;
  discharging a continuous fluid flow through the inlet port into the chamber and mixing in the chamber the continuous fluid flow with the oscillatory flow to produce a pulsed jet;
  discharging the pulsed jet from the orifice into the primary airflow;
  sensing at least one characteristic of the primary airflow as it flows across the aerodynamic surface; and
  controlling the oscillatory flow in response to the characteristic sensed to manipulate the pulsed jet.

10. The method according to claim 9, wherein sensing a characteristic of the primary air flow is performed by a sensor located downstream on the aerodynamic surface from the orifice.

11. The method according to claim 9, wherein controlling the oscillatory flow comprises controlling an amplitude and frequency of the oscillatory flow.

* * * * *